Aug. 29, 1950 S. VAN MIERLO 2,520,185

PULSE INTERCOMMUNICATION TELEPHONE SYSTEM

Filed Aug. 6, 1947 2 Sheets-Sheet 1

INVENTOR
STANISLAS VAN MIERLO
BY Robert Harding Jr.
ATTORNEY

PULSE INTERCOMMUNICATION TELEPHONE SYSTEM

Filed Aug. 6, 1947 2 Sheets-Sheet 2

INVENTOR
STANISLAS VAN MIERLO
BY Robert Harding Jr.
ATTORNEY

Patented Aug. 29, 1950 2,520,185

UNITED STATES PATENT OFFICE 2,520,185

PULSE INTERCOMMUNICATION TELEPHONE SYSTEM

Stanislas Van Mierlo, Paris, France, assignor to International Standard Electric Corporation, New York, N. Y., a corporation of Delaware Application August 6, 1947, Serial No. 766,583
In France July 4, 1946

Section 1, Public Law 690, August 8, 1946
Patent expires July 4, 1966

2 Claims. (Cl. 179—15)

The present invention relates to intercommunication telephone systems.

In known intercommunicating telephone systems there are as many lines as telephone substations and, from any substation it is possible to call directly any other substation by selecting the corresponding line. Such installations have therefore even for a relatively small number of substations, a large number of lines and costly wiring, and it is often preferred when the number of substations exceeds for instance ten, to install a private branch exchange, manual or automatic, where all the substations are connected by one pair of wires.

One object of the present invention is to eliminate the private branch exchange while a simple interconnecting network is used, connecting all the substation sets. This result is obtained by using a system of pulses for the transmission of the voice current and for signaling.

In an embodiment all the substation sets are connected to two common lines, one for transmission and one for reception. From a central point pulses of very short duration are sent on the first line, these pulses in the first place connect the receivers of the substations to the receiving line at instants that are respectively characterizing one of the substations, in the second place they make it possible for a calling substation to send voice amplitude modulated pulses at instants characterizing the called substation. These pulses arrive therefore at the called subscriber at the instants when the receiver of the telephone set is connected to the receiving line, and the voice of the calling subscriber regenerated in the receiver.

On the other hand, the system must be such that it is possible to determine whether the line called is busy or not, to call this line and to avoid interfering with a connection already established.

It is known to reproduce a periodical current representing, for instance, the voice by means of a series of pulses transmitted at regular intervals the amplitude of which varies according to the fluctuations of the current to be transmitted.

The minimum number of pulses per second is from two to three times the maximum frequency which it is desired to transmit, for the voice, for instance, it will be necessary to use about 8,000 pulses per second. If, however, these pulses are very short, for example, of a duration of one microsecond, it is possible to place between two consecutive pulses used for a given telephone channel another series of impulses used for other channels, in this way it is possible for a given number of substations, all of them connected to the same line, to communicate simultaneously two by two. But, in order to avoid any cross-talk between two conversations, it is necessary to connect effectively the receiver of a telephone substation only at the instant when the pulses intended for this receiver are received.

The invention will be described in relation to an embodiment and to the drawings in which—

Figure 1:
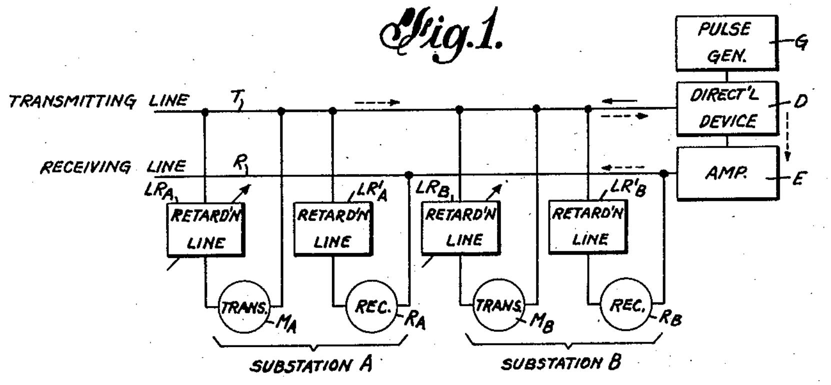
Figure 1 shows a schematic incorporating features of the invention.

Referring to Figure 1, G is the pulse generator, giving, for instance 8,000 pulses per second which are transmitted on the transmitting line T. At substation A, a retardation line $LR'_A$ delays these pulses for a fixed length of time $t_A$, which characterizes substation A. The delayed pulses effectively connect the receiver $R_A$ to the receiving line R at instants $t_A$, computed from the time pulses are transmitted by G.

In a similar way, receiver $R_B$ is effectively connected to line R only at instants $t_B$. In order that substation A may be able to speak to substation B, it is necessary that A adjust the delay of a variable retardation line $t_B$. This line is connected to the transmitter $M_A$, in such a way that the pulses received from G, amplitude modulated by transmitter $M_A$ and sent back on the line T, arrive on the receiver $R_B$ through a directional device D, and eventually an amplifier E and the line R, at instants when this receiver $R_B$ is effectively connected to line R.

In the same manner, substation B must adjust its retardation line $LR_B$ at delay $t_A$ corresponding to substation A, in such a way that the pulses modulated by transmitter $M_B$ arrive at instants $t_A$ at receiver $R_A$. It is clear that the time of propagation along lines T and R must be taken into account, if necessary, in the adjustment of the retardation lines.

Figure 2:
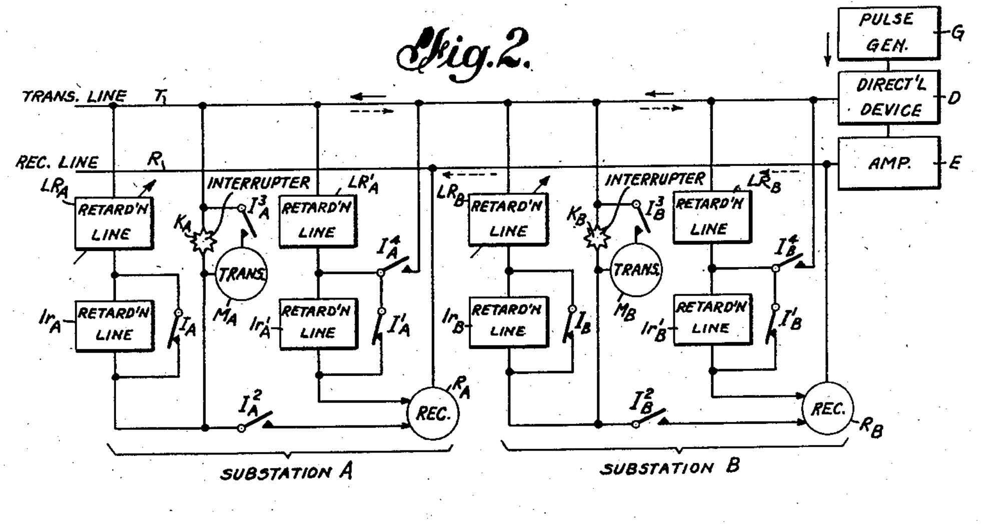
Figure 2 is another schematic.

Figure 2 shows a more detailed schematic comprising auxiliary devices such as busy tests, call, non-interference of a third substation in a connection.

To this effect, every substation is characterized by a given time delay $t$ computed from the time of transmission of one pulse for the busy tests and for calling and by a time delay $t+\Delta t$ for conversation. The additional delay $\Delta t$ at each substation are respectively produced by two additional retardation lines $lr$ and $lr'$ placed into the circuit at the time of conversation by means of contact of I and I'.

For calling every substation has an interrupter K which modulates in amplitude the pulses received from the line T at a frequency which is, for example, of the order of 1,000 to 2,000 cycles per second. These modulated pulses may produce in a receiver R a sound which can be heard at a distance.

When A wants to talk with B, he adjusts $LR_A$ to the delay $t_B$ and closes contact $I_A^2$. Its receiver $R_A$ is thus effectively connected to the line R at times $t_B$ thru $LR_A$ T, D, and E.

Figure 3:
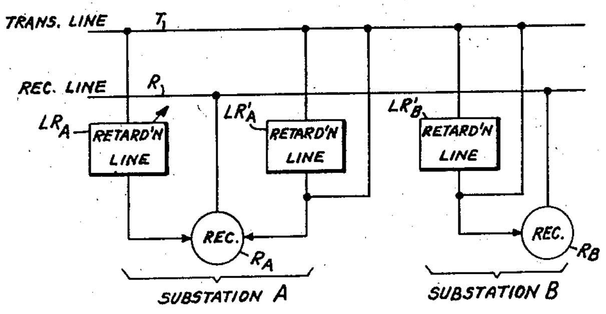
Figures 3, 4, 5 and 6 are simplified schematics of the installation shown on Figure 2 at different stages of the connection.

In case B is busy, contact $I_B^4$ is closed and $LR_B'$ transmits on line R thru D and E pulses at instants $t_B$ which are received by A. Figure 3 shows the circuit at the stage.

Figure 4:
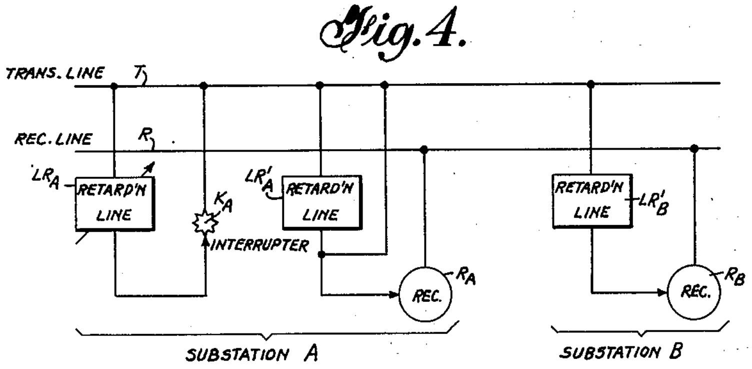

In case when B is not busy, A operates interrupter $K_A$ which modulates in amplitude the pulses delayed by $LR_A$ and this produces in receiver $R_B$ a loud tone. Figure 4 shows the circuits at this stage.

As soon as B replies, contact $I_B^4$ is closed. Pulses are transmitted at instant $t_B$ and this places B in busy condition.

Figure 5:
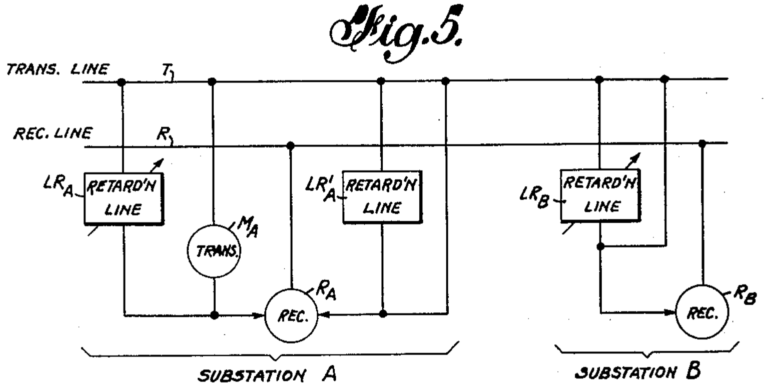

Figure 5 shows the circuits at this stage.

Figure 6:
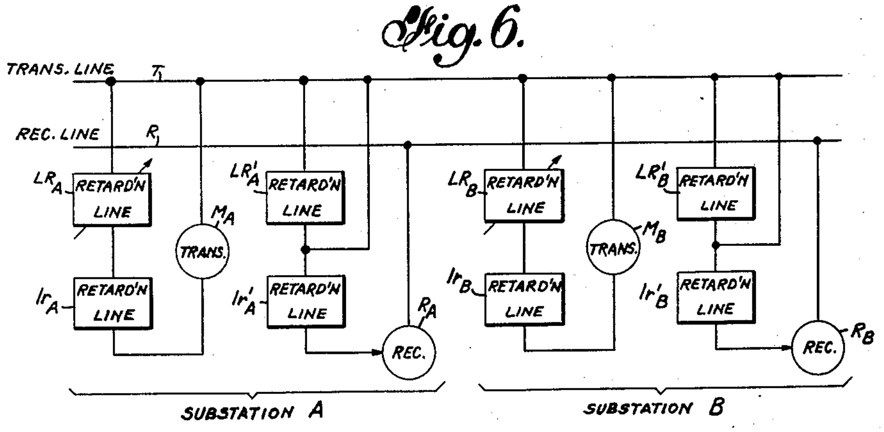

B then adjusts its retardation line $LR_B$ to delay $t_A$ and calls A with interrupter $K_B$. Since $R_A$ (or $R_B$) has received the call and since A (or B) is at its substation telephone set, contacts $I_A$ and $I_A'$ (or $I_B$ and $I_B'$) open, contacts $I_A^2$ (or $I_B^2$) also open. Contact $I_B^3$ is then closed. The two substation sets are at this time in condition for conversation, transmission being made in direction A—B at times $t_B+\Delta t$ and in direction B—A at times $t_A+\Delta t$. Figure 6 shows the circuit at this stage.

No other substation set can receive signals at this time. However, it might send signals if, being already connected to a 4th substation set, it changes the adjustment of its retardation line LR. It is possible to prevent this by providing a locking device (not shown).

Although the invention has been described with regard to a particular embodiment, it is clear that it is in no way limited to this embodiment.

In particular, it is possible to simplify the arrangement shown. It is possible, in fact, to suppress the fixed retardation lines LR' and $lr'$ by adjusting the two substation sets which are to be connected so that they operate at the same characteristic instants, for example, that of the called subscriber. In this case, the normal value given to retardation line LR of each line will be that giving a delay equal to the length of time which characterizes this substation set, this value being changed only during a call or for a conversation originating in this substation set, to adjust it to the normal value of the delay of the called substation set.

According to another embodiment of the invention, it is possible to provide only one common line for all the substation sets. A sense is given to the primary pulses generated by the pulse generator, for instance, positive in a given direction, and negative for the amplified pulses used in the other direction. In this case, rectifiers will be used to direct these pulses to the proper apparatus.

The connection of the receivers with the lines may be made either by vacuum tubes or by other variable resistance devices, such as, dry rectifiers. The lines may be made of two screened parallel wires, or of a coaxial pair.

It is also possible to provide a call register with each substation or at a central point, in this case, there must be provided with the call register retardation lines, respectively adjusted to the characteristic delay of each substation set.

What is claimed is:

1. In an intercommunication telephone system, a plurality of subscribers' sets, transmission means connecting all of said sets, means for applying pulses of very short duration to said transmission means, a first receiving means at each of said sets connected to said transmission means for receiving said pulses, a second receiving means at each of said sets connected to said transmission means, means controlled by said first receiving means at each set for rendering said second receiving means at each of said sets responsive to said pulses for predetermined characteristic times, and a third receiving means at each set for receiving said pulses from said transmission means including modulating means for modulating with intelligence the pulses thus received, variable time delay means for delivering said modulated pulses to said transmission means, additional time delay means for each of said first receiving means and said third receiving means; one of said delay means serially connecting corresponding of said first receiving means and corresponding of said sets, and the other of said delay means serially connecting corresponding of said third receiving means and corresponding of said sets, and means to render said delay means inoperative when said sets are not in conversation condition.

2. In an intercommunication telephone system, a plurality of subscribers' sets, two common lines connecting all of said subscribers' sets, one of said lines being employed for transmission, the other one of said lines being employed for reception, means for applying to said transmission line, pulses of a very short duration, each of said subscriber's sets responsive to said pulses at predetermined characteristic times, means responsive to said pulses connecting said subscribers' sets receivers with said receiving line at instants corresponding to the predetermined times which characterize each of said subscribers' sets respectively, whereby a calling subscriber's set voice-modulates said pulses at the times which characterize the called subscriber's set, and variable means at the called subscriber's set to delay said pulses a predetermined characteristic time corresponding to said calling subscriber's set.

STANISLAS VAN MIERLO.

REFERENCES CITED

The following references are of record in the file of this patent:

UNITED STATES PATENTS

| Number | Name | Date |
|---|---|---|
| 2,406,165 | Schroeder | Aug. 20, 1946 |